United States Patent
Kenny

Patent Number: 5,876,282
Date of Patent: Mar. 2, 1999

[54] WEATHER CAP

[76] Inventor: Robert L. Kenny, 811 Fabulous, San Antonio, Tex. 78216

[21] Appl. No.: 899,820

[22] Filed: Jul. 24, 1997

[51] Int. Cl.⁶ .................................................. F23L 17/12
[52] U.S. Cl. ...................... 454/367; 138/89.4; 138/96 R; 454/4
[58] Field of Search ................................. 454/2, 4, 367; 138/89.4, 96 R

[56] References Cited

U.S. PATENT DOCUMENTS

| | | |
|---|---|---|
| 3,744,528 | 7/1973 | Vestal . |
| 4,184,516 | 1/1980 | Oesterritter et al. . |
| 4,370,919 | 2/1983 | Wagner et al. ........................... 454/367 |
| 4,936,351 | 6/1990 | Wells et al. ......................... 138/96 R X |
| 5,687,773 | 11/1997 | Ryan et al. ............................. 454/4 X |
| 5,738,285 | 4/1998 | Anderson ........................... 138/96 R X |

*Primary Examiner*—Harold Joyce
*Attorney, Agent, or Firm*—Terrance L. Siemens

[57] ABSTRACT

A weather cap for use with a vent cap. The weather pipe includes a top surface portion which is mounted at an angle in relation to a side wall extending downwardly from the top surface portion. The weather cap also includes a device for securing the cap structure fixedly to the pipe, and a device for connecting and retaining the cap structure to the securing device.

2 Claims, 2 Drawing Sheets

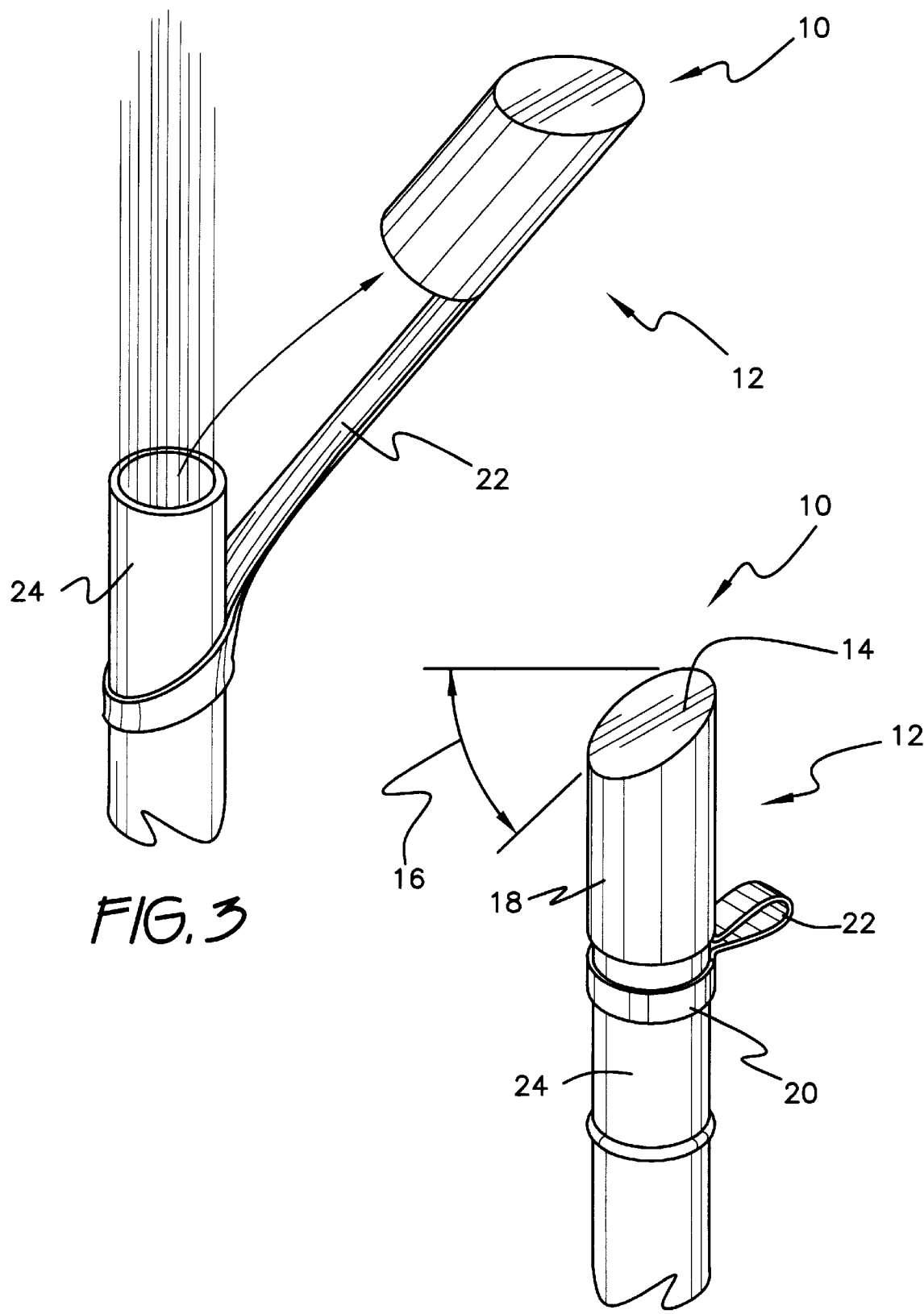

WEATHER CAP

FIELD OF THE INVENTION

This invention can generally be used in the natural gas industry, seismic and geology sciences, underground cable industry, landfill and sewage industry, petroleum, water/food service, chemical industries, brewing industries, pulp mill industries and irrigation management. More specifically, this invention relates to a weather cap for underground pipes which are usually pressurized.

DESCRIPTION OF THE PRIOR ART

In the underground piping industry, weather caps are used to protect the interior of the pipe from weather, insects, animals and their residuals. The caps protect the pipe from debris and precipitation. Yet, in the natural gas industry, these pipes serve another purpose, allowing the cover to blow-off when the pipe becomes filled with dangerous natural gases. Pressure built up from the natural gases in the pipe cause the protective cover to blow-off.

U.S. Pat. No. 4,936,351, issued to Janet W. Wells on Jun. 26, 1990, describes a blow off cap for a vent stack or blow off pipe. This arrangement uses a clamp secured around the vent stack that has a cord attached to the cap to secure it in place. However, unlike the present invention, the clamp cord and cap are separate pieces. In the present invention the blow off cap, the securing means and the means for attaching the two are one piece.

U.S. Pat. No. 3,744,528, issued to George W. Vestal on Jul. 10, 1973, describes a closure device for a tubular opening. This closure device fits over the tube lip and extends into the interior of the tube. However, unlike the present invention, this method allows the accumulation of debris and foreign objects which may corrode the cap structure. In the present invention the cap extends above the pipe to prevent accumulation of debris.

U.S. Pat. No. 4,184,516, issued to Richard B. Oesterritter et al. On Jan. 22, 1980, describes a pipe cap which retains a cap for a pipe. However, unlike the present invention, nuts are used for retaining the pipe cap. In the present invention no additional equipment or materials are required for the cap to be retained to the pipe.

None of the above inventions and patents, taken either singly or in combination, is seen to describe the instant invention as claimed.

BACKGROUND OF THE INVENTION

One of the features of the weather cap is to protect the inside of the pipe from becoming exposed to environmental agents. In the prior art, weather caps have been made which have a planar surface to protect the pipe.

Since the top portion of the cap is planar, any environmental agents such as debris and precipitation can sit on the top portion. The build up of these environmental agents causes the top surface to sag which may shorten the product life and structural stability of the weather cap.

Thus, there is a need in the art for a weather cap which provides stability and extended product life.

Yet another feature of the weather cap is that once the cap is blown off, it remains secured to the pipe through the use of a ring-shaped loop.

In the prior art, clamps have been used to secure the cap to the pipe. Clamps are usually comprised of rigid metal structures which may rust as a result of exposure to precipitation and debris thereby shortening the product life of the weather cap.

Thus, there is a need in the art for a securing means which have extended product life.

SUMMARY OF THE INVENTION

Underground natural systems provide the backbone for energy supply to homes and businesses around the globe. However, just as natural gas can be helpful with cooking or heating, its combustible nature makes it a dangerous natural resource. Natural gases trapped in underground pipes can cause rupture and ultimate disruption of natural gas service to homes, businesses and industries.

Relief valves allow hazardous gases located within to be released into the air. The release of hazardous materials allows the pipe to function normally thereby preventing any hazardous situations which may occur due to the buildup of gas.

Covers have been designed for relief valves which allow pipes to release hazardous gases while keeping out precipitation and debris.

In accordance with the present invention, there is provided a weather cap which has a top cover mounted at an angle with respect to the side walls of the cover. The slope of the top portion sheds debris and precipitation, prevents sagging and deflects damaging environmental particles. The 45° slope contributes to the extended product life and structural stability while offering the same protection as a cap mounted on a 90° slope.

A weather cap which is secured to a pipe by a single unit is also provided. The single unit has a lanyard and an anchor ring which is mounted to the pipe. This construction of the securing means is such that it will extend product life of the weather cap.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 2 is a perspective view of the weather cap of the present invention demonstrating the position of the cap while resting atop a pipe.

FIG. 3 is a perspective view of the weather cap of the present invention demonstrating the position of the cap as it is blown-off the pipe.

DETAILED DESCRIPTION OF THE PREFERRED EMBODIMENT

Figure 1:
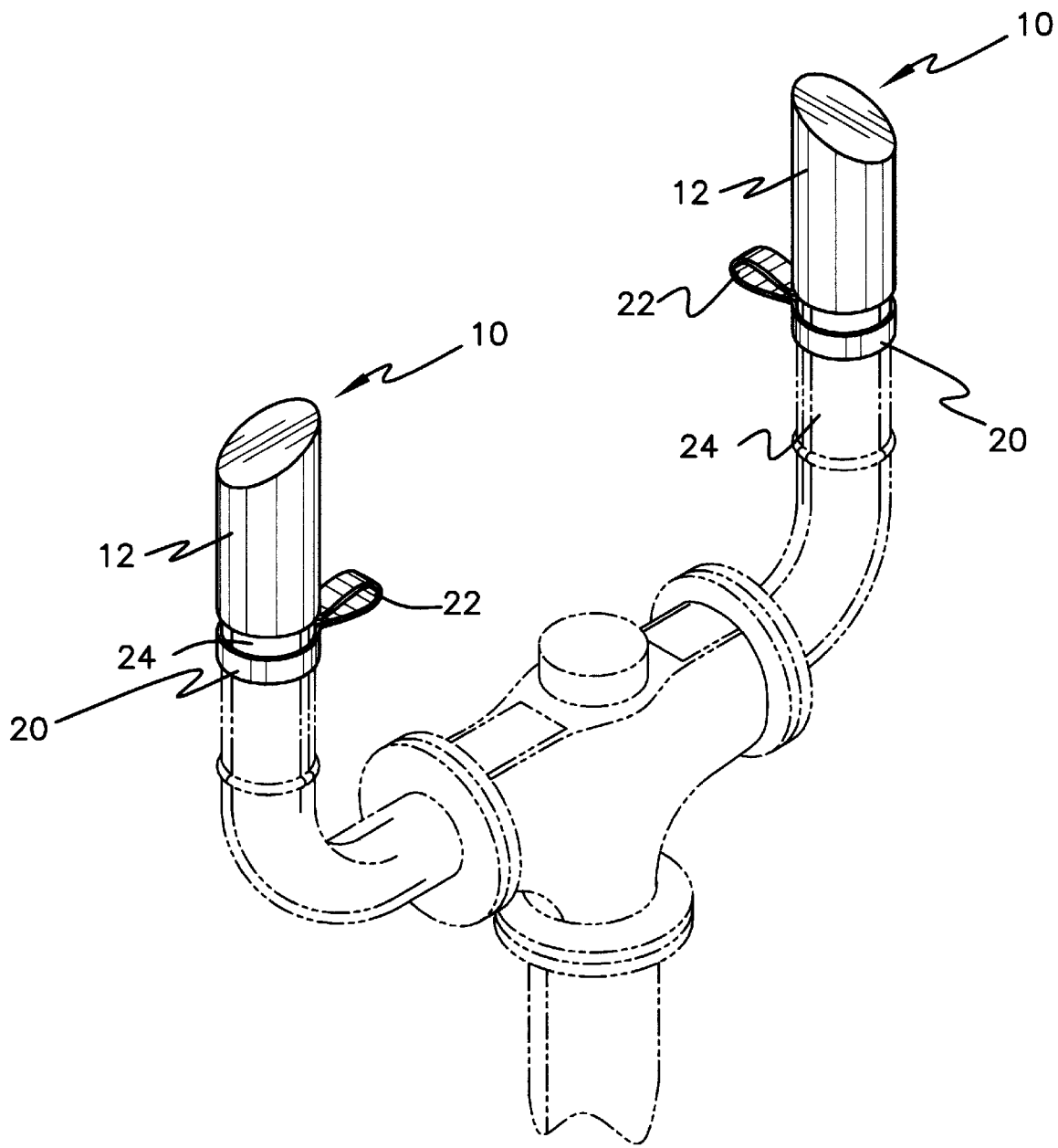
FIG. 1 is a perspective view of the weather cap of the present invention positioned atop a pipe.

Now referring to the drawings, FIG. 1 illustrates a weather cap installed on a pressure relief valve system. The weather cap is designated generally by reference numeral 10. Each weather cap in FIG. 1 is located on top of a pipe structure (known as the exhaust nipple in the industry) of the pressure relief valve system. The weather cap shown in FIG. 1 demonstrates the position of the weather cap before the pressure relief valve has been activated, which shall be referred to as the "resting" state.

As shown in FIG. 1, the weather cap is comprised of three main parts: a cap structure 12, means for securing 20, and means for connecting and retaining 22. While in the resting state, the means for securing 20 and the cap structure 12 are secure around the circumference of a pipe 24 of the pressure release system.

The weather cap is constructed of highly durable plastic with ultra violet inhibitors added which withstands exposure to precipitation and debris. The plastic is composed of material which is flexible, but strong, allowing the cap to withstand pressure from the built-up gases.

The color of the weather cap of the preferred embodiment is bright yellow which allows the cap to be readily visible to the naked eye. The brightness of the cap allows an observer on the ground or in the air to easily determine the position of the cap-i.e. whether the cap is in a resting state or whether the cap has been blown off. If the cap has been blown off, the pressure relief valve has to be reset and the cap needs to be returned to its resting state, positioned atop the pipe 24.

Now referring to FIG. 2, the weather cap 10 is shown in the resting state, positioned atop the pipe 24 which is known as the exhaust nipple in the industry. The weather cap is used to protect the interior of the pipe 24 from precipitation and debris which may clog the pipe thereby inhibiting the pipe from emitting built up gases.

The cap structure 12 and the means for securing 20 are constructed so as to fittingly engage the outside surface of the pipe. The sizes of the pipe range from 0.75" to 4" in diameter, and it can be appreciated that the interior cross sectional diameter of the weather caps is just slightly greater than the pipe diameters.

The top surface 14 is positioned at a 45 degree angle, shown as reference numeral 16, in relation to the side wall 18 of the cap. The slope of the top surface sheds precipitation and debris thereby preventing sagging and deterioration. The slope of the top surface contributes to extended product life and overall stability of the weather cap.

As shown in FIG. 2, the means for securing 20 and the cap structure 12 are positioned proximate each other causing the means for connecting and retaining 22 to be flaccid. The means for connecting and retaining 22 must be flaccid in order for the weather cap to function properly once the pressure release valve is opened. If the means for connecting and retaining 22 was rigid, the cap portion 12 could not be separated from the means for connecting and retaining, thereby causing the weather cap to malfunction during the blow off operation. The means for securing 20 is a circular ribbon shaped lanyard and the means for connection and retaining is a wide ribbon shaped tether.

The weather cap as depicted in the Figures has been manufactured as a single unit including the lanyard and anchor ring. The single unit construction of the weather cap is available for pipes with circumferences ranging from 0.75" through 4". For larger sized pipes, weather caps may be constructed with or without the lanyard and anchor ring.

FIG. 3 depicts the operation of the weather cap as the pressure relief valve has been opened. Once the pressure relief valve has been opened, the cap structure 12 is blown off the pipe.

When the pressure relief valve has been opened and the cap structure 12 is being blown off, the means for connecting and retaining 22 becomes rigid. The means for connecting and retaining 22 secures the cap portion 12 to the pipe preventing the cap portion from becoming a capricious, dangerous missile.

It is to be understood that the present invention is not limited to the embodiments described above, but encompasses any and all embodiments within the scope of the following claims.

I claim:

1. A weather cap for a vertical gas line vent pipe, where the pipe includes a pressure relief valve contained therein, said weather cap being constructed of a semi-rigid material, said cap comprising:

a generally cylindrical outer wall adapted to fit over the exterior of the vent pipe, said generally cylindrical outer wall having;
    a first end that includes a generally circular opening having substantially the same diameter as said cylindrical outer wall;
    a second, closed end disposed at an approximate 45 degree angle in respect to said generally circular opening; where said weather cap further includes
a circular ribbon shaped lanyard adapted to cooperate closely with the vent pipe; and
a wide ribbon shaped tether monolithically formed with both said cylindrical outer wall and said lanyard, where said tether is attached to said circular outer wall proximate said first end; whereby said weather cap is placed over the vent pipe having the pressure relief valve therein, said cylindrical outer wall and said second closed end angle cooperate to prevent ambient or biological contamination of the interior of the vent pipe, said second closed end disposed at said 45 degree angle shed precipitation and debris thereby preventing sagging and deterioration of the closed end of said weather cap while on the vent pipe, and when the pressure relief valve releases pressure within the vent pipe, said monolithically formed said ribbon shaped lanyard and said wide ribbon shaped tether prevent said weather cap from being detached from the vent pipe and simultaneously give visual indication that the pressure relief valve has released.

2. The weather cap according to claim 1, wherein said weather cap is constructed of a flexible UV resistant plastic material and is brightly colored such that the visual indication of whether or not the pressure relief valve has blown is easily discernable from a distance.

* * * * *